United States Patent [19]

Itakura et al.

[11] Patent Number: 4,587,529

[45] Date of Patent: May 6, 1986

[54] THERMAL COLUMNAR-ALIGNED, PLURAL-HEATERS PRINT HEAD

[75] Inventors: Kazuharu Itakura; Fukuo Matsumura; Hideyuki Uejima, all of Tokyo, Japan

[73] Assignee: NEC Corporation, Tokyo, Japan

[21] Appl. No.: 647,560

[22] Filed: Sep. 5, 1984

[30] Foreign Application Priority Data

Sep. 5, 1983 [JP] Japan ............................... 58-162049

[51] Int. Cl.[4] .......................... G01D 15/10; B41J 3/20

[52] U.S. Cl. ............................... 346/76 PH; 346/1.1; 400/120

[58] Field of Search .......................... 346/76 PH, 1.1; 400/120

[56] References Cited

FOREIGN PATENT DOCUMENTS 56-25471 3/1981 Japan .

58-25973 2/1983 Japan .

58-211470 12/1983 Japan .

*Primary Examiner*—E. A. Goldberg

*Assistant Examiner*—Gerald E. Preston

*Attorney, Agent, or Firm*—Sughrue, Mion, Zinn, Macpeak, and Seas

[57] ABSTRACT

The invention relates to a thermal printing head having a plurality of heating elements arrayed in both column and row directions, which can be driven selectively and independently. A first column group is comprised of two or more columns each having heating elements which are aligned in the row direction, and which can be independently sequentially driven. A second column group is comprised of two or more columns, also having heating elements aligned in the row direction, but with the rows being offset in the column direction as compared with the rows of the first column group. The arrangement allows the double printing of each printable dot, yet facilitates the wiring of the individual heating elements by providing a larger space between adjacent rows and column groups.

11 Claims, 4 Drawing Figures

THERMAL COLUMNAR-ALIGNED, PLURAL-HEATERS PRINT HEAD

This invention relates to a thermal printer head, and more particularly to a thermal printer head comprising plural heating-element-columns each including plural aligned heating elements.

In a conventional thermal printer head, there are positioned two heating-element-columns parallel to each other with each of the heating-element-columns including a plurality of aligned heating elements. In each heating-element-row, two heating elements positioned in the same row but in different columns are driven (heated) in response to the same data to be recorded on the recording medium at different time points, and are driven at the same time point (simultaneously) in response to data corresponding to two dot-points adjacent to each other on the recording medium. The different time points have a time period corresponding to the time in which the recording medium is shifted by a distance equal to a pitch of the two heating elements, whereby dots to be formed by the two heating elements are recorded on the same dot point of the recording medium.

However, such a conventional thermal printer head has the following disadvantages: It is difficut to wire the current supply lines (lead lines), becauses it is hard to provide a sufficiently broad space between the heating elements in both (row and column) directions, because the heating elements are quite close to one another in both directions. Further, since the heating elements in the two columns may be driven simultaneously, driving electric current must be applied simulataneously to the heating elements in the two columns, and so a large peak current is required.

It is, therefore, an object of this invention to provide a thermal printer head comprising plural heating-element-columns each including aligned plural heating elements, in which a broader space for wiring lead lines can be provided and wherein a great peak current for driving the thermal printer head is not required.

According to this invention, a thermal printer head for recording on a recording medium in response to recording data comprises a first column-group having a plurality of first heating-element-columns, and a second column-group provided apart from the first column-group and having a plurality of second heating-element-columns. Each heating-element-column in the first and second column-groups includes a plurality of heating elements lined up in a first direction. In each of the first and second column-groups, the heating elements in different heating-element-columns are lined up in a second direction perpendicular to the first direction to provide a plurality of first heating-element-rows and a plurality of second heating-element-rows, respectively. The first and second heating-element-rows are displaced from each other in the first direction by a distance equal to one-half of a pitch of the heating elements in each column in the first direction.

Other features and advantages of this invention will be apparent from the following description of preferred embodiments of this invention taken in conjunction with the accompanying drawings, wherein.

Figure 1:
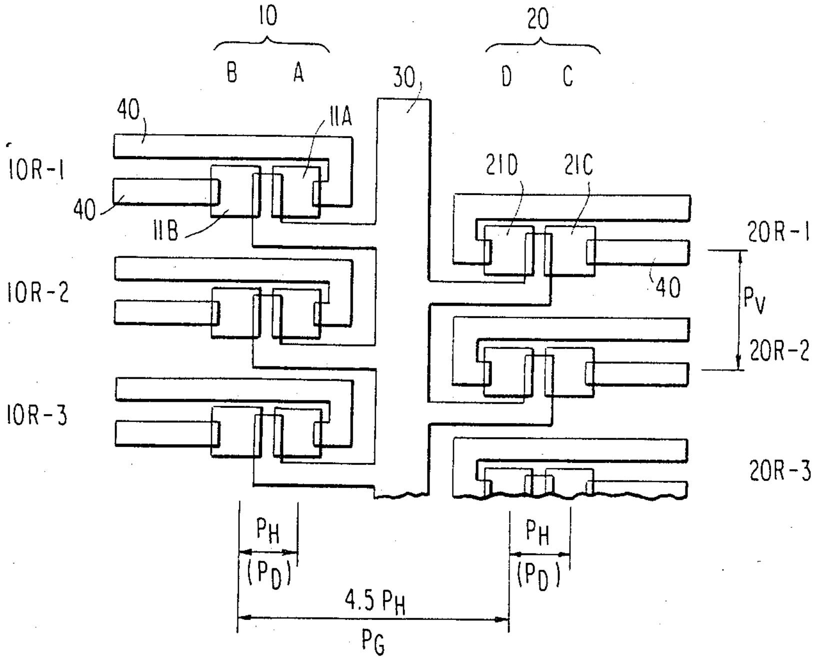
FIG. 1 is a schematic view of a first embodiment of this invention.

Referring to FIG. 1, the first embodiment of this invention comprises first and second column-groups 10 and 20. The first column-group 10 has two first heating-element-columns A and B. Each of the first heating-element-columns A and B includes a plurality of first heating elements 11 (11A and 11B) lined up in a vertical direction. The two first heating elements 11A and 11B adjacent to each other in the first heating-element-columns A and B are lined up in a horizontal direction, that is, in a head moving direction to provide a plurality of first heating-element-rows 10R (10R-1, 10R-2, 10R-3, . . . ). The second column-group 20 has two second heating-element-columns C and D. Each of the second heating-element-columns C and D includes a plurality of second heating elements 21 (21C and 21D) lined in the vertical direction. The two second heating elements 21C and 21D adjacent to each other in the second heating-element-columns C and D are lined up in the horizontal direction to provide a plurality of second heating-element-rows 20R (20R-1, 20R-2, 20R-3, . . . ). The first and second heating-element-rows 10R and 20R are displaced to each other in the vertical direction by a distances to one-half of a vertical pitch $P_V$ of the heating elements so that productions thereof are sandwiched with each other.

In eah heating-element-row, a horizontal pitch (element-to-element pitch) $P_H$ of the heating elements is determined to be equal to a dot pitch $P_D$ of dots to be recorded on a recording medium (not shown). A column-group pitch $P_G$ between the first and second column-groups is determined to be equal to a distance multiplied the horizontal pitch $P_H$ by $(n+0.5)$ where n is an integer), for example, 4.5 $P_H$ in this embodiment The first embodiment further comprises a common lead 30 connected to one end of all the heating elements 11 and 21, and a plurality of signal supplying leads 40 respectively connected to the other end of all the heating elements 11 and 21. Driving signals for heating the heating elements 11 and 21 are supplied through the signal supplying leads 40 in response to recording data.

Figure 2:
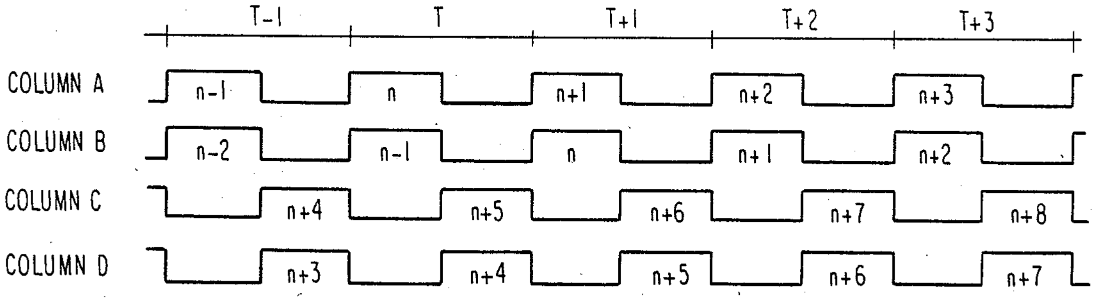
FIG. 2 is timing chart of driving signals to be respectively applied to a plurality of heating-element-columns in the first embodiment shown in FIG. 1.

A recording operation of this thermal printer head according to the first embodiment will be described with reference to FIG. 2 showing timing charts of the driving signals to be applied to the heating elements in the heating-element-columns A, B, C and D.

At a first phase of a timeing period (T), the driving signals for a recording column (n) on the recording medium are applied to the heating elements 11A in the heating-element-column A in response to recording signals S(n) representative of recording dots to be recorded in the recording column (n). In this phase, the heating elements 11B are also driven in response to the recording signals $S(n-1)$ for the recording column $(n-1)$ to record dots at positions in the recording column $(n-1)$, on which dots had been recorded by the heating elements 11A in the first phase of the previous timing period $(T-1)$ in response to the recording signals $S(n-1)$. Similarly, at each first phase in the sequential timing periods, the heating elements 11A are driven in response to the recording signals $S(n+i)$ to record in the recording column (n+i), and simultaneously the heating elements 11B are driven in response to the recording signals S(i−1) to record in the recording column (n+(i−1)), on which the heating elements 11A had recorded in the previous timing period. Thus, the first dot-rows are recorded along the first heating-element-rows 10R on the recording medium, while the thermal printer head is moved in the horizontal direction in synchronism with the timing periods.

In a second phase of the timing period (T) after the thermal printer head has been moved in the horizontal direction by a distance equal to one-half of the horizontal pitch $P_H$ ($\frac{1}{2}P_H$), the driving signals for a recording column (n+5) on the recording medium are applied to the heating elements 21C in the heating-element-column C in response to recording signals S(n+5) representative of recording dots to be recorded in the recording column (n+5). In this phase, the heating elements 21D are also driven in response to the recording signals S(n+4) for the recording column (n+4) to record dots at positions in the recording column (n+4), on which dots had been recorded by the heating elements 21C in the first phase of the previous timing period (T−1) in response to the recording signals S(n+4). Similarly, at each first phase in the sequential timing periods, the heating elements 11A are driven in response to the recording signals S(n+i+5) to record in the recording column (n+i+5), and simultaneously the heating elements 21D are driven in response to the recording signals S(i+4) to record in the recording column (n+(i+4)), on which the heating elements 21C had recorded in the previous timing period. Thus, the second dot-rows are recorded along the second heating-element-rows 20R on the recording medium, while the thermal printer head is moved in the horizontal direction in synchronism with the timing periods.

Since the first and second heating-elements-rows 10R and 20R are displaced from each other by a distance equal to one-half of the vertical pitch $P_V$ ($\frac{1}{2}P_V$), the second dot-rows are positioned between the first dot-rows, to thereby complete the dot matrix.

Figure 3:
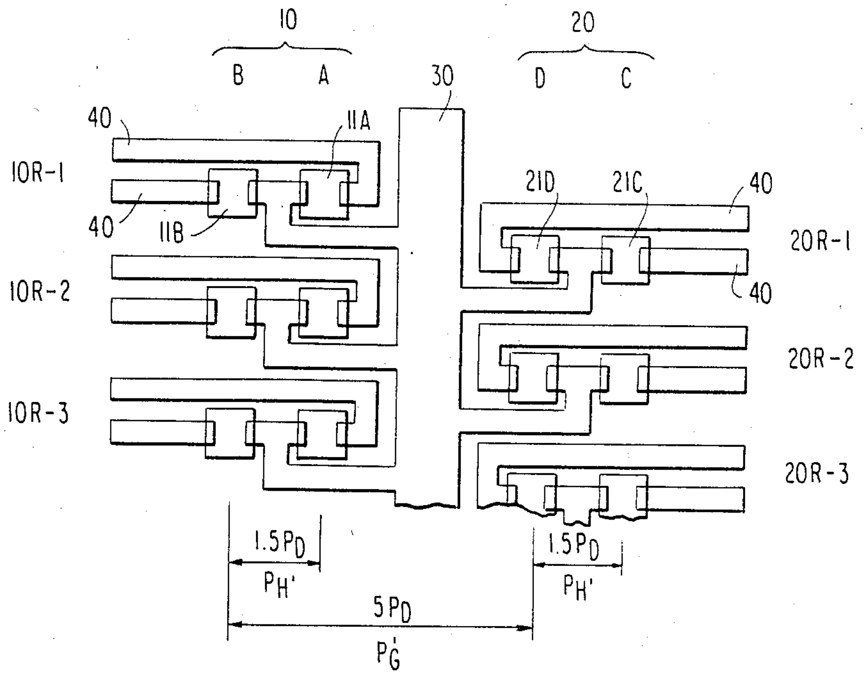
FIG. 3 is a schematic view of a second embodiment of this invention.

Referring to FIG. 3, the second embodiment of this invention is identical to the first embodiment except that the horizontal pitch (element-to-element pitch) $P_H'$ is $1.5P_D$, and column-group pitch $P_V'$ is $5P_D$.

Figure 4:
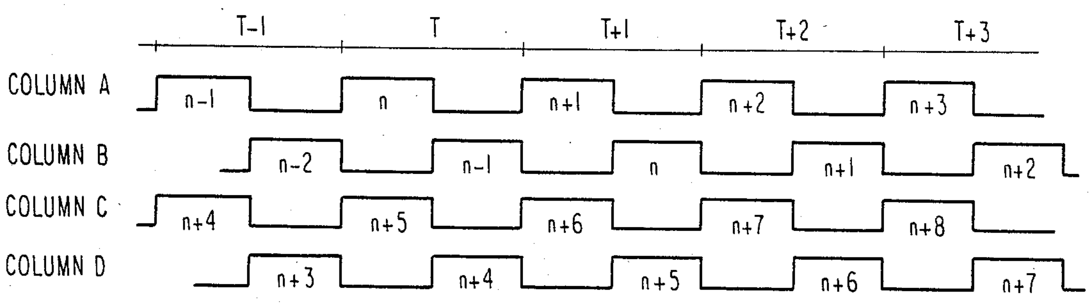
FIG. 4 is timing chart of driving signals to be respectively applied to a plurality of heating-element-columns in the second embodiment shown in FIG. 3.

The second embodiment is supplied with driving signals having the timing shown in FIG. 4, by which the heating elements 11A and 21C are driven simultaneously at the first phase of each timing period, and the heating elements 11B and 21D are driven simultaneously at the second phase of each timing period.

According to this invention, since the first and second column-groups are positioned apart from each other, it is easy to maintain a broader space for the wiring of the leads. Further, because only one-half of all the heating elements are driven simultaneously, a great peak electric current is not required.

What is claimed is:

1. A thermal printer head for recording on a recording medium in response to recording data, said thermal printer head comprising:

a first column-group having a plurality of first heating-element-columns, each of said heating-element-columns including a plurality of first heating elements aligned in a first direction, said first heating elements in different heating-element-columns being aligned in a second direction perpendicular to said first direction to provide a plurality of first heating-element-rows, each of said first heating elements being connected between a common lead line and an individual lead line so that said first heating elements can be driven selectively and independently;

a second column-group provided apart from said first column-group and having a plurality of second heating-element-columns, each of said second heating-element-columns including a plurality of second heating elements aligned in said first direction, said second heating elements in different heating-element-columns being aligned in said second direction to provide a plurality of second heating-element-rows, each of said second heating elements being connected between a common lead line and an individual lead line so that said second heating elements can be driven selectively and independently, said plurality of first heating-element-rows being displaced in said first direction with respect to said plurality of second heating-element-rows; and a common lead conductor located between said first column-group and second column-group and running in said first direction, each common lead line connected to each first heating element and each common lead line connected to each second heating element being connected to said common lead conductor.

2. The thermal printer head as claimed in claim 1, wherein said plurality of first heating-element-rows are displaced with respect to said plurality of second heating-element-rows by a distance equal to one-half of a pitch of said heating elements in each heating element column in said first direction.

3. The thermal printer head as claimed in claim 1, wherein a group-to-group pitch between said first and second column-groups in said second direction is greater than an element-to-element pitch between adjacent heating elements in each heating element column in said second direction.

4. The thermal printer head as claimed in claim 1, wherein driving signals are applied to one-half of said first and second heating elements simultaneously via said individual lead lines.

5. A thermal printer head comprising:

a first column-group having first and second heating-element-columns arranged in a vertical direction, said first and second heating-element-columns including a plurality of first and second heating elements, respectively, said first and second heating elements being aligned in a horizontal direction to provide a plurality of first heating-element rows;

a second column-group located apart from said first column-group in said horizontal direction and having third and fourth heating-element-columns arranged in said vertical direction, said third and fourth heating-element-columns including a plurality of third and fourth heating elements, respectively, said third and fourth heating elements being aligned in said horizontal direction to provide a plurality of second heating-element-rows, said first heating-element-rows being offset with repect to said second heating-element-rows in said vertical direction; and a plurality of lead lines individually connected to each of said first, second, third and fourth heating elements whereby said heating elements can be energized selectively and independently.

6. The thermal printer head as claimed in claim 5, wherein horizontal pitches between said first and second heating-element-columns and between said third and fourth heating-element-columns have a distance which is an integral multiple of a dot pitch to be recorded on a recording medium, while a horizontal pitch between said first and second column-groups has a distance which is an integral half multiple of said dot pitch.

7. The thermal printer head as claimed in claim 6, wherein said third and fourth heating elements are energized simultaneously following the simultaneous energization of said first and second heating elements.

8. The thermal printer head as claimed in claim 5, wherein horizontal pitches between said first and second heating-element-columns and between said third and fourth heating-element-columns have a distance which is an integral half multiple a dot pitch to be recorded on a recording medium, while a horizontal pitch between said first and second column-groups has a distance which is an integral multiple of said dot pitch.

9. The thermal printer head as claimed in claim 8, wherein said second and fourth heating elements are energized simultaneously following the simultaneous energization of said first and third heating elements.

10. A thermal printer head for recording on a printing medium in response to recording data, said thermal printer head comprising:

a first column-group having a plurality of first heating elements arrayed in a first direction to form first and second columns, and in a second direction perpendicular to said first direction to form 1st, 2nd, 3rd, . . . , (n−2)-th, (n−1)-th and (n)-th rows (n=3,4, . . . ), said first heating elements in said first and second columns being spaced apart from each other in said second direction by a first distance equal to or greater than a dot pitch to be recorded on said printing medium, to form a first column space, said first heating elements in said 1st, 2nd, 3rd, . . . , (n−2)-th, (n−1)-th, and (n)-th rows being spaced apart from each other in said first direction by a second distance equal to twice said dot pitch, to form 1st, 2nd, 3rd, . . . (n−2)-th and (n−1)-th row spaces, respectively;

a second column-group having a plurality of second heating elements arrayed in said first direction to form third and fourth columns and in said second direction to form 1st, 2nd, 3rd, . . . , (m−2)-th, (m−1)-th and m-th rows (m=3,4 . . . ), said second heating elements in said third and fourth columns being spaced apart from each other in said second direction by a third distance equal to said first distance, to form a second column space, said second heating elements in said 1st, 2nd, 3rd, . . . , (m−2)-th, (m−1)-th and m-th rows being spaced apart from each other in said first direction by a fourth distance equal to said second distance, to form 1st, 2nd, 3rd, . . . , (m−2)-th and (m−1)-th row spaces, respectively, said first and second column groups being spaced apart from each other in said second direction by a fifth distance greater than said first distance, to form a group space, said 1st, 2nd, 3rd, . . . , (m−2)-th, (m−1)-th and m-th rows being offset with respect to said 1st, 2nd, 3rd, . . . , (n−2)-th, (n−1)-th and (n)-th rows in said first direction by said dot pitch, respectively;

a common lead conductor provided in said group space and extending in said first direction, said second column being located between said common lead conductor and said first column, said third column being located between said common lead conductor and said fourth column, each of said first and second heating elements in said second and third columns having first and second ends opposed to each other in said second direction, said first ends being positioned on the side of said common lead conductor, and each of said first and second heating elements in said first and fourth columns having third and fourth ends opposed to each other in said second direction, said third ends being positioned on the side of said common lead conductor;

a plurality of first common lead lines each connected at one end to said common lead conductor and running within said 1st, 2nd, 3rd, . . . , (n−2)-th, and (n−1)-th row spaces in said second direction, respectively, the other ends of said first common lead lines being commonly connected to the second ends and the third ends of respective first heating elements on said 1st, 2nd, 3rd, . . . , (n−2)-th and (n−1)-th rows, respectively;

a plurality of second common lead lines each connected at one end to said common lead conductor and running within said 1st, 2nd, 3rd, . . . , (m−2)-th and (m−1)-th row spaces in said second direction, respectively, the other ends of said second common lead lines being commonly connected to the second ends and the third ends of respective second heating elements on said 1st, 2nd, 3rd, . . . , (m−2)-th and (m−1)-th rows, respectively;

a plurality of first and second supplying lead lines, each for supplying a signal, in response to said recording data, to said first and second heating elements in said second and third columns, respectively, said first and second signal supplying lines being connected to said first ends of said first and second heating elements and extending within said 1st, 2nd, 3rd, . . . , (n−2)-th and (n−1)-th row spaces and within said 1st, 2nd, 3rd, . . . , (m−2)-th and (m−1)-th row spaces in said second direction, respectively; and a plurality of third and fourth signal supplying lead lines, each for supplying said signal to said first and second heating elements in said first and fourth columns, respectively, said third and fourth signal supplying lines being connected to said fourth ends of said first and second heating elements and extending in said second direction, but away form said common lead conductor.

11. A method of printing characters on a printing medium with a thermal printer head having a plurality of heating elements, comprising the steps of:

arranging said heating elements in first, second, third and fourth columns in a first direction, each of said columns having a plurality of heating elements, said heating elements in said first and second columns being arrayed in a second direction perpendicular to said first direction to provide a plurality of first rows while said heating elements in said third and fourth columns are arrayed in said second direction to provide a plurality of second rows, said second rows being offset with respect to said first rows in said first direction;

selectively actuating the heating elements in said first column to form first recording dots arrayed in said first direction on said printing medium, said first recording dots being spaced apart from each other in said first direction;

advancing said thermal printer head in said second direction to a position in which the heating elements in said second column are opposed to said first recording dots;

selectively actuating said heating elements in said second column to form second recording dots on said printing medium at positions where said first recording dots have been formed;

advancing said thermal printer head in said second direction to a position at which said third column is in alignment with the column of said first recording dots;

selectively actuating said heating elements in said third column to form third recording dots on said printing medium at positions between said first recording dots in said first direction;

advancing said thermal printer head in said second direction to a position in which the heating elements in said fourth column are opposed to said third recording dots; and selectively actuating said heating elements in said fourth column to form fourth recording dots on said recording medium at positions where said third recording dots have been formed.

* * * * *

UNITED STATES PATENT AND TRADEMARK OFFICE

CERTIFICATE OF CORRECTION

PATENT NO. : 4,587,529

DATED : May 6, 1986

INVENTOR(S) : Kazuhara Itakura et al.

It is certified that error appears in the above-identified patent and that said Letters Patent is hereby corrected as shown below:

Column 2, Line 23, after "lined" insert --up--.

Column 2, Line 34, after "in" delete "eah" insert --each--.

Signed and Sealed this

Twenty-third Day of December, 1986

*Attest:*

DONALD J. QUIGG

*Attesting Officer* *Commissioner of Patents and Trademarks*